Nov. 20, 1951  S. R. SMITH, JR  2,575,931
ISOLATING DEVICE
Filed Sept. 1, 1948
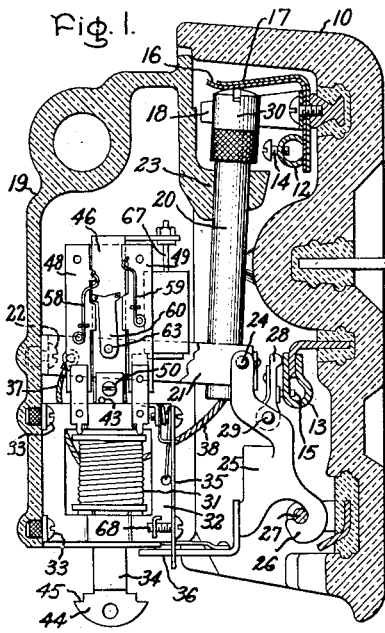
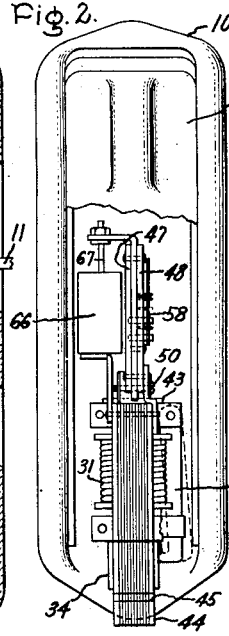
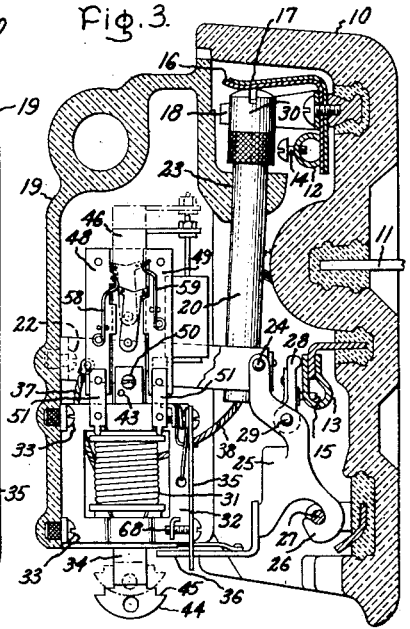
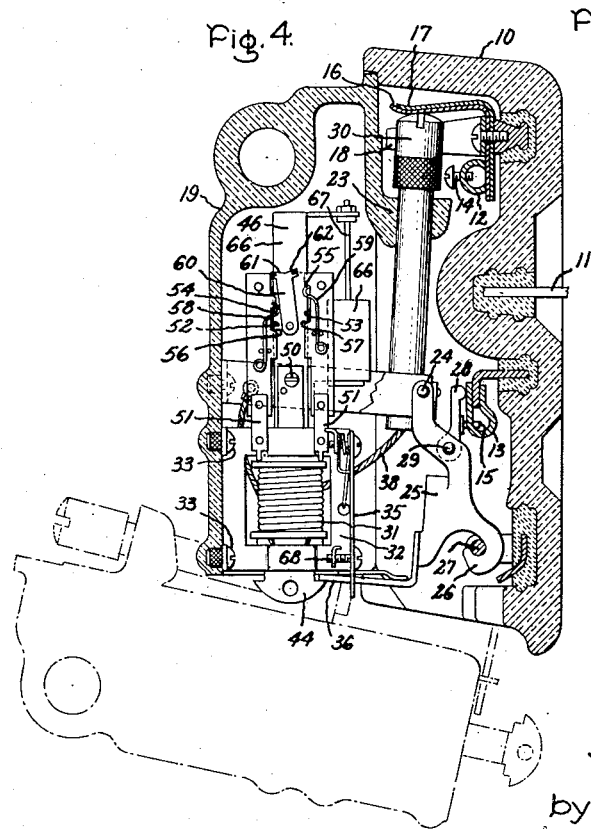
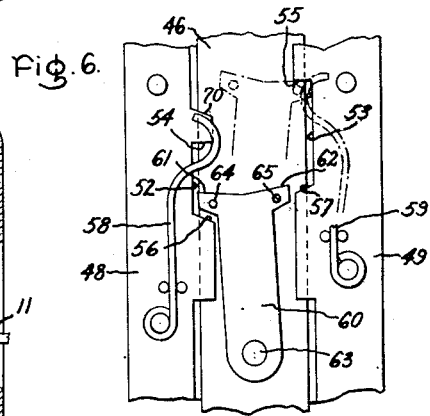
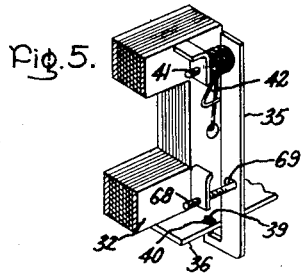
Inventor:
Sidney R. Smith Jr,
by Ernest H. Britton
His Attorney.

Patented Nov. 20, 1951

2,575,931

UNITED STATES PATENT OFFICE 2,575,931

ISOLATING DEVICE

Sidney R. Smith, Jr., Pittsfield, Mass., assignor to General Electric Company, a corporation of New York Application September 1, 1948, Serial No. 47,298

8 Claims. (Cl. 200—108)

This invention relates to a new and improved circuit opening device and more particularly to an automatic circuit isolating or sectionalizing device adapted for use in connection with automatically operated reclosing circuit breakers in electric power distribution systems.

When a permanent heavy current fault or short circuit occurs on a branch circuit of such a distribution system, it is desirable to isolate that particular branch from the system and permit service to be continued on the remainder of the system which has been unaffected. Prior art devices which are effective to carry out this function after the feeder main has been energized by such overcurrent through an automatic reclosing breaker a given number of times are complicated and therefore too costly for widespread use on all branches of a power distribution system.

As pointed out in the copending Lincks application, Serial No. 41,791, filed July 31, 1948, now Patent No. 2,564,701, August 21, 1951, and assigned to the same assignee as this application, there is therefore an ever increasing demand for less costly devices to carry out this isolating function to economically permit their employment in all branches of power distribution systems.

It is, therefore, an object of this invention to provide a simple, compact, and improved circuit opening device which may be used in connection with prior art holders for fuse cutouts.

It is also an object of this invention to provide a circuit opening device in which a contact releasing means is responsive to successive current impulses above a predetermined value but is successively blocked from carrying out this function until after the occurrence of a predetermined number of such impulses.

It is a further object of this invention to provide an improved circuit opening device which will be conditioned for operation by a fault current but whose contacts will be held in engagement thereafter until the fault current has been interrupted by another device connected in series relationship therewith.

In accordance with this invention a circuit opening device is provided in which circuit completing contacts are normally held in engagement by a releasable latching means the release of which is effected upon the occurrence of a predetermined one of successive current impulses through the contacts above a predetermined value by a current responsive means movable in response to these successive impulses but which is successively blocked from carrying out this function prior to a particular impulse. In the particular embodiment of my invention shown in the drawing this successive blocking is effected by the alternate engagement of a pivoted dog mounted on the movable current responsive means with stationary stops positioned on each side of and staggered in the direction of movement of the current responsive means, when said means is energized by successive impulses.

The invention will be better understood from the following description when taken in connection with the accompanying drawing, and the scope of the invention will be pointed out in the appended claims. In the drawings, Fig. 1 is a side elevation view, partly in section, of my improved opening device in the normal closed circuit position; Fig. 2 is a front view of the device shown in Fig. 1 with the cover or door cut away; Fig. 3 is a sectional view similar to Fig. 1 illustrating the relative position of elements in the device after it has responded to two fault current impulses; Fig. 4 is a sectional view similar to Fig. 1 still in the closed circuit position but after a fault current has caused the device to be conditioned for opening and Fig. 5 is a detail view in perspective of the elements which, when released, condition the device for opening and Fig. 6 is an enlarged view of the blocking elements.

Referring now to Figs. 1 to 4 of the drawing, I have illustrated my invention in connection with a housing 10 of porcelain or similar insulating material of the size and shape used for fuse cutouts of the prior art, such as is disclosed, for example, in United States Letters Patent 2,081,813, assigned to the same assignee as the present application. To the rear of the housing or casing 10 is secured a mounting bar 11 for the attachment of the casing to an electric line pole and cross-arm structure or the like. Conductors which are brought into the housing through holes in the housing side wall are adapted to be connected to terminals 12 and 13 by means of binding screws 14 and 15 respectively. Upper contact 12 has a contact finger 16 backed up by means of a spring strip 17 which serves to press or bias the finger 16 downwardly and has also a pair of spaced resilient contact latching fingers 18, only one of which can be seen in the drawing.

A movable door or cover 19, preferably constructed of insulating material, is provided for housing 10 and suitably supports a contact support tube 20 and my circuit opening elements to be described hereinafter. Door support bracket 21 is formed by bending a metallic bar of conducting material at two points equidistant from the midpoint of its predetermined length to form, in plan, an open-sided isosceles trapezoid, the open side of which is closed by welding or otherwise suitably fixing the two free ends of the trapezoid to a metallic circular cylindrical tube having a length equal to the width of the bars as viewed in the drawing, and an inside diameter slightly larger than the outside diameter of the contact support tube. This bracket, which is not shown in Fig. 2 in the interest of simplicity, is rigidly fixed to the door by means of screws 22. Contact support tube 20 is made of insulating material and is mounted on the cover adjacent its upper end by means of projection 23 of insulating material formed integrally with the cover and provided with an opening for accommodating the tube. The tube is supported adjacent its lower end by insertion into the cylindrical part of the door support bracket, and is rigidly held therein by pivot pin 24 which engages an opening in the cylinder and passes through a groove in the wall of the tube perpendicular to its axis.

A metal lever 25 of conducting material supports cover 19 and is bifurcated at its upper end to form a fork, only one arm of which is visible in the drawing. The arms of the fork are pivotally connected to the cylindrical part of the door support bracket by means of pin 24. Lever 25 is provided at its lower end with a hook portion 26 which passes over a pivotal pin 27 secured in housing 10. Lever 25, prior to the final open circuit position, is electrically connected to the lower contact terminal 13 by means of a contact finger 28 which is pivotally connected between the forks of lever 25 at 29. Contact finger 28 is biased in a clockwise direction to provide the desired contact pressure and also to urge cover 19 and its connected parts to the open position.

Contact cap 30 is threadedly mounted on the upper end of contact support tube 20 and when the door is closed, as shown in the figures, this cap passes between the resilient contact latching fingers 18 and engages contact finger 16, all of which are connected to upper contact terminal 12.

The circuit opening elements of the circuit opening device consist of an electromagnet 31 mounted on its frame 32 which is, in turn, rigidly mounted on cover 19 by means of screws 33, a armature 34, a first latch member 35 and a second latch member or arm 36 rigidly fixed to and projecting from hooked-shaped lever 25. One end of the electromagnet winding is electrically connected by flexible conductor 37 to cover support bracket 21, while the other end of the winding is connected to contact cap 30 by flexible conductor 38 which passes up through the contact support tube 20 and is electrically connected by solder or other suitable means to a button head. The button head, of the type conventionally employed for fuse links, is fixed in good conducting relationship between the top of the fuse tube and the contact cap when the cap has been screwed down tight on the tube threads. Thus, the electromagnet is electrically connected in series relationship with terminals 12 and 13 by way of contact finger 16, contact cap 30, conductor 38, conductor 37, cover support bracket 21, pivot pin 24, forked arms of lever 25, pivot pin 29 and contact finger 28.

From an inspection of the drawing, it is obvious that the device as a whole, exclusive of the housing, is pivotally mounted on pin 27 and constitutes a toggle mechanism, one arm of which consists of hooked-shaped lever 25 and the other arm consists of cover support bracket 21, door 19 and the various elements hereinbefore described and mounted thereon. These two arms are interconnected at the knee of the toggle by pin 24. When in the condition shown by Fig. 1, the toggle mechanism is in rigid position with movable contact cap 30 and contact finger 28 in electrical engagement with terminals 12 and 13, respectively. These conatcts are held in engagement and the toggle maintained in rigid position by the engagement of a projection 39 on latch 35 with an aperture 40 in the second latch or projecting arm 36 of the hooked-shaped lever 25 as better illustrated by Fig. 5. Latch 35 is pivotally mounted at 41 on the frame 32 of the electromagnet and is biased by spring 42 in a counterclockwise direction, as viewed in Fig. 5. However, the biasing actions of contact 16 on contact cap 30 and contact finger 28 urge projecting arm 36 in a counterclockwise direction, as viewed in Fig. 1, about pivot pin 27 to maintain the latch and projecting arm in engagement. The winding of the electromagnet is wound on a spool, the inside diameter of which is sufficient to accommodate armature 34 for axial movement therein. Armature 34 is prevented from falling by gravity out of the magnet by the engagement of a suitable projection such as a screw or pin 43 thereon with the magnet frame, and better illustrated in Fig. 2, and is provided at the lower end with an enlarged head 44 containing ledge or lip 45 thereon. Since the door assembly is mounted on hinge pin 27, it is obviously also movable manually into and out of the position shown in Fig. 1 for disconnecting purposes. The device as thus far described is identical to the circuit opening device described in the previously referred to copending application of Lincks, Serial No. 41,791, filed July 31, 1948.

However, in accordance with the present invention, armature 34 is provided with an extension plate 46 projecting upwardly between the spaced arms of bracket 21 and mounted for slidable movement between guide plates 47, 48 and 49. Extension 46 may be an integral part of armature 34 or as illustrated, a separate plate connected to the armature by a pin or screw 50. The guide plates are riveted together and rigidly mounted by means of brackets 51 on armature frame 32. Guide plates 48 and 49 are spaced apart on the same side of armature extension 46 and the adjacent edges thereof are provided with elongated notches 52 and 53 respectively. The upper end edges 54 and 55 of notches 52 and 53 respectively are at substantially a right angle to the elongated edge of the notches and staggered with respect to each other while the lower end edges 56 and 57 are sloped downwardly from the elongated edge an are also staggered with respect to each other. Resilient springs 58 and 59 are mounted fixedly at one end on guide plates 48 and 49 respectively with the free ends thereof adjacent the upper end edges 54 and 55 respectively of notches 52 and 53. A dog comprising an elongated lever 60 having a pair of ears or projections 61 and 62 extending laterally in opposite directions from one end thereof is pivotally mounted at the opposite end by pivot pin 63 on the vertical or longitudinal centerline of armature extension 46. Insofar as the invention is concerned, the dog or at least the projections thereon may have a thickness greater than the thickness of guide plates 48 and 49. However, the projections 61 and 62 have been illustrated as having a thickness equal to the thickness of these guide plates and are provided with extensions or pins 64 and 65 respectively projecting therefrom. Numeral 66 represents any conventional or well-known time delay means rigidly mounted on armature frame 32 and having a vertically movable rod 67 rigidly connected to a lateral projection of armature extension 46.

Under normal current conditions, the tube 20, the door 19 and all the elements hereinbefore described and mounted thereon will be held as illustrated in Fig. 1 so the contact cap 30 is in contact with terminal contact 16 and thus with terminal 12 by the engagement of latch 35 with latch or projecting arm 36 on hook-shaped member 25. Upon the occurrence of a fault above a predetermined value on the branch in which the device has been connected, the electromagnet 31 will be sufficiently energized to pull armature 34 and amature extension 46 fixed thereto upwardly. This upward motion of the armature will move projection 61 on the dog upwardly within notch 52 and the pin 64 thereon into engagement with the free end of spring 58 in the path of travel thereof. Due to the inertia of the dog resulting from its mass and relatively rapid upward motion, the free end of spring 58 will thereupon be flexed out of the path of travel and projection 61 will thereafter engage the upper end edge 54 of the notch 52 whereupon further upward movement of armature 34 will be arrested short of engagement of lip 45 thereon with the free end of projecting arm 36 with which it is aligned.

Promptly following this first impulse of current above a predetermined value, a conventional automatic recloser which has also operated in response to this value of current and is located in the circuit closer to the power source, will interrupt the circuit. Since electromagnet 31 will thereby be deenergized, armature 34 and armature extension 46 will begin to drop downwardly and projection 61 on the dog will become disengaged from the upper end edge 54 of notch 52. Thereupon, spring 58 which has previously been stressed by the engagement of pin 64 therewith will be effective to throw or swing the dog about its pivot and projection 62 thereon into engagement with the oppositely disposed notch 53 in the edge of guide plate 49. By virtue of time delay mechanism 66 connected through rod 67 to the armature extension 46 this downward movement will be retarded or relatively slow compared to the prior upward thrust. Mechanism 66 is so adjusted and notch 53 is so proportioned in relation to the operation of the recloser with which the device is designed to cooperate that the recloser will close the circuit before the lower edge of projection 62 engages the lower end edge of notch 53. If the fault is still on the branch, armature 34 will again be attracted upwardly and be effective to move projection 62 upwardly within notch 63 and pin 65 into engagement with the free end of spring 59 whereupon the spring will be flexed and projection 62 will engage the upper end edge 55 of notch 53 as illustrated by the broken lines in Fig. 6. As a result, upward travel of armature 34 and lip 45 thereon will again be arrested at a point relatively closer to the free of the arm 36 than was the case at the termination of the previous advance of the armature. When magnet 31 is again deenergized by the next opening of the recloser, spring 59, like spring 58, will be effective to throw projection 62 out of engagement with notch 53 and projection 61 into engagement with the adjacent edge of guide plate 48 at a point above notch 52 as illustrated by the broken lines in Fig. 3. Then upon the next closing of the circuit by the recloser the armature and the dog, now free of notches to impair upward travel, will move to their full extreme upper position shown in Fig. 4 and thereby permit engagement of lip 45 with the end of latch or projecting arm 36 to raise it sufficiently to disengage the aperture 40 therein from projection 39. Thereupon, holding latch 35 will be released for counterclockwise rotation under the biasing action of spring 42. Actually, the upward movement of projection 36 is a slight clockwise motion of the arm and toggle 25 about the hinge pin 27 which at the same time results in and is permitted by a slight additional upward movement of the entire cover assembly. The counterclockwise travel of latch 35 is limited by a screw or pin 68 mounted on the magnet frame and passing through a slot 69 in the latch as viewed best in Fig. 5. The relationship between this pin and slot is such that in its extreme released position the projection 39 on the latch is completely out from under the arm 36 so that downward or counterclockwise motion of the arm about pin 27 will no longer be prevented by latch 35. However, the toggle mechanism is nevertheless prevented from collapsing and the contacts are held in engagement not by latch 35 but by the lip or ledge 45 on the head 44 of the armature continuing to engage the end of the arm 36 and thereby acting directly as a latch until such time as the recloser again interrupts the circuit. When this occurs the electromagnet is again deenergized to allow downward movement of armature 34 to its lowermost position shown in Fig. 1, the freeing of projecting arm 36 for counterclockwise movement about pin 27, collapse of the toggle mechanism and finally disengagement of the contacts and opening of the door to the position shown by the broken lines in Fig. 4.

It will be apparent that if, after a first closure but prior to a second interruption of the circuit by the reclosure, the fault is removed from the circuit branch, the armature will, under the retarding action of time delay means 66, begin to move slowly downward and the dog will simultaneously be thrown counterclockwise by spring 59 after which projection 62 will first be thrown back into engagement with notch 53 by the engagement of projection 61 with the downwardly sloping edge 70 of guide plate 48, then projection 61 will be thrown or reset to its initial position in notch 52 by engagement of projection 62 with the downwardly sloping end edge 57 of notch 53 whereupon the armature will have reached its initial lowest position shown in Fig. 1 without having effected release of latch 35.

Although the particular device hereinbefore described is effective to isolate a branch upon the third interruption of a reclosure, it will be obvious to those skilled in the art that by the subtraction of a notch or addition of notches or stops, such a device could be rendered effective to isolate a branch upon the occurrence of a second or any higher number of interruptions by a recloser. Thus, one operative to perform this function upon a fourth interruption may be employed in the main feeder of a distribution system; one operative upon a third interruption may be employed in a main branch connected to the main feeder and one operative upon a second interruption may be employed in each of several sub-branches connected to the main branch.

Thus, I have provided a circuit opening or sectionalizing device which because of its general simplicity may be manufactured and sold for a relatively small price compared to the cost of prior art sectionalizing devices whereby the employment of a larger number of such devices to isolate faults to the smallest portion of a power distribution system is now economically feasible.

Obviously, the device will cooperate equally as well with a multi-shot fuse cutout as with an automatic recloser or with any other circuit breaking device providing similar operating characteristics.

While I have, in accordance with the patent statutes, shown a particular embodiment of my invention, other changes or modifications will be obvious to those skilled in the art and I, therefore, aim in the appended claims to cover all such changes or modifications as fall within the true spirit and scope of my invention.

What I claim as new and desire to secure by Letters Patent of the United States, is:

1. In a circuit opening device, a pair of cooperative contacts, means biasing one of said contacts out of engagement with the other contact, means holding said contacts in engagement against the biasing action of said biasing means, current responsive means movable from a normal at rest position in response to a predetermined current impulse through said contacts above a predetermined value to effect release of said contact holding means, means including inertia means operative in response to movement of said current responsive means to block release of said contact holding means upon the occurrence of a first current impulse through said contacts above said predetermined value, spring means operative to render said blocking means ineffective upon the occurrence of a fall of said current below a predetermined value and permit release of said contact holding means upon the occurrence of a closely succeeding subsequent current impulse through said contacts above said first mentioned predetermined value and time delay means operatively connected to said current responsive means and effective to delay return of said current responsive means to its normal at rest position prior to the occurrence of said subsequent current impulse.

2. In a circuit opening device, a pair of normally closed contacts, current responsive means responsive to a current impulse through said contacts above a predetermined value and having a movable element operatively movable in a direction toward a predetermined position each time said means responds to a current impulse above said predetermined value, means responsive to the movement of said movable element to said predetermined position and a subsequent decrease of the current through said contacts below a predetermined value for effecting the opening of said contacts, blocking means engageable by said movable element upon the occurrence of a current impulse above said predetermined value for stopping the movement of said movable element before it can reach said predetermined position, means responsive to a predetermined number of movements of said movable element in response to closely succeeding current impulses above said predetermined value for rendering said blocking means ineffective to prevent movement of said movable element to said predetermined position and time delay means operatively connected to said movable element and effective to delay return thereof, between said predetermined movements, to the position from which it has been moved.

3. In a circuit opening device, a pair of normally closed contacts, an electromagnet having a winding connected in series with said contacts and responsive to a current impulse through said contacts above a predetermined value, a movable element including armature for said electromagnet operatively movable in a direction toward a predetermined position each time said magnet responds to a current impulse above said predetermined value, means responsive to the movement of said armature to said predetermined position and a subsequent decrease of the current through said contacts below a predetermined value for effecting the opening of said contacts, blocking means engageable by said movable element upon the occurrence of a current impulse above said predetermined value for stopping the movement of said armature before it can reach said predetermined position, means responsive to a predetermined closely succeeding number of movements of said armature in response to current impulses above said predetermined value for rendering said blocking means ineffective to prevent movement of said armature to said predetermined position and time delay means operatively connected to said movable element to delay the return thereof, between said predetermined number of movements, to the position from which it has been moved.

4. In a circuit opening device, a pair of normally closed contacts, current responsive means responsive to a current impulse through said contacts above a predetermined value and having a movable element operatively movable in a direction toward a predetermined position each time said means responds to a current impulse above said predetermined value, means responsive to the movement of said movable element to said predetermined position and a subsequent decrease of the current through said contacts below a predetermined value for effecting the opening of said contacts, blocking means including a plurality of stationary stops for successively and respectively stopping the movement of said movable element to said predetermined position upon the occurrence of successive current impulses through said contacts above said predetermined value, means responsive to a predetermined closely succeeding number of successive movements of said movable element in response to current impulses above said predetermined value for rendering the blocking means ineffective to prevent movement of said movable element to said predetermined position and time delay means operatively connected to said movable element to delay return thereof, between said successive current impulses, to the position from which it has been moved.

5. In a circuit opening device an arrangement for releasing a contact holding means which normally holds a pair of relatively movable contacts in engagement against the action of biasing means urging said contacts out of engagement comprising means movable from a normal at rest position in response to successive current impulses through said contacts above a predetermined value to an extreme position to effect release of said contact holding means upon the occurrence of a predetermined one of said successive impulses, a stationary stop, a dog movable with said current responsive means and operative in response to a first current impulse through said contacts above said predetermined value for engagement with said stop to block release of said contact holding means, a resilient spring operative in response to a subsequent decrease of said current below a predetermined value to render said dog ineffective for engagement with said stop and permit movement of said current responsive means to said extreme position and release of said contact holding means upon the occurrence of a closely succeeding subsequent current impulse through said contacts above said predetermined value and time delay means operatively connected to said current responsive means and effective to delay return thereof to its normal at rest position prior to the occurrence of said subsequent current impulse.

6. A circuit opening device comprising a pair of cooperative contacts, means biasing one of said contacts out of engagement with the other contact, means holding said contacts in engagement against the bias of said biasing means, an electromagnet having a winding connected in series relationship with said contacts, an armature for said electromagnet movable from a normal at rest position to an extreme attracted position to effect release of said contact holding means, a dog pivotally mounted on said movable armature, a resilient spring and a stationary blocking means in the path of movement of said dog, said dog being operative in response to a current impulse through said contacts exceeding a predetermined value to move said spring out of its path of travel for engagement of said dog with said stationary blocking means to prevent release of said contact holding means, said spring being operative in response to a subsequent fall of said current below a predetermined value to swing said dog about its pivot to prevent engagement with said blocking means and permit said armature to release said contact holding means upon the occurrence of a closely succeeding subsequent current impulse through said contacts above said first mentioned predetermined value and time delay means operatively connected to said armature and effective to delay return thereof to its normal at rest position prior to the occurrence of said subsequent current impulse.

7. An arrangement for releasing a contact holding means which normally holds a pair of relatively movable contacts in engagement against the action of biasing means urging said contacts out of engagement comprising an electromagnet having a winding connected in series with said contacts, an armature for said electromagnet operatively movable from a normal at rest position in response to successive current impulses through said contacts to an extreme attracted position upon the occurrence of a predetermined one of said successive impulses to thereupon effect release of said contact holding means, a dog pivotally mounted on and movable with said armature, a plurality of stationary stops spaced along and alternately positioned on opposite sides of the path of movement of said dog, a resilient spring positioned adjacent each of said stops, said dog being operative in response to said successive current impulses to successively and alternately engage said oppositely disposed stops to effect advance of said armature to said extreme position in a step by step manner, each of said springs being operative subsequent to an engagement of said dog with said stop adjacent thereto to swing said dog about its pivot to prevent subsequent engagement upon occurrence of the next impulse with said stop and time delay means operatively connected to said armature and effective to delay return thereof to its normal at rest position between said successive current impulses.

8. A circuit opening device comprising a pair of cooperative contacts, means biasing one of said contacts out of engagement with the other contact, means holding said contacts in engagement against the biasing action of said biasing means, an electromagnet having a winding connected in series relationship with said contacts, an armature for said electromagnet movable from an at rest position to an extreme attracted position to effect release of said contact holding means, an extension on said armature movable therewith and comprising an elongated rectangular plate mounted for slidable movement between guide plates a pair of which are positioned on the same side of a face of said armature extension plate with adjacent edges of said pair of plates spaced from and on opposite sides of the longitudinal axis of said extension plates, an elongated notch in each of said adjacent edges the corresponding end edges of said notches being staggered with respect to each other in a direction parallel to the longitudinal axis of said armature extension, a yieldable spring mounted on one of said spaced plates with a free end thereof adjacent an end edge of said notch in said plate, a similar spring mounted on the other of said spaced plates with a free end thereof adjacent the corresponding end edge of said notch in said other plate, a dog comprising an elongated lever pivoted at one end on said face of said armature extension and having a pair of projections extending laterally in opposite directions from the opposite and free end thereof, said dog movable with said extension in the space between said pair of spaced plates and said projections engageable respectively with said springs mounted on said spaced plates and slidably engageable respectively with said notches therein, time delay means operatively connected to said armature, said armature being operative in response to a first current impulse through said contacts above a predetermined value to slidably move one of said projections on said dog within one of said notches into engagement with and to effect flexing of one of said springs and engagement with said notch end edge adjacent thereto to block further movement of said armature, said spring being operative in response to a subsequent drop of said current through said contacts below a predetermined value to swing said dog about its pivot and said other projection thereon into engagement with said other notch, said armature being operative in response to a second current impulse through said contacts above said predetermined value to slidably move said other projection within said other notch into engagement with and to effect flexing of said other spring and engagement with the notch end edge adjacent thereto to block further movement of said armature at a point in advance of said prior movement, said other spring being operative in response to a drop of said current through said contacts below a predetermined value, subsequent to said second impulse, to swing said other projection out of engagement with said other notch to permit movement of said armature to its extreme attracted position and effect release of said contact holding means upon the occurrence of a third current impulse through said contacts above said predetermined value, said time delay means being operative to delay return of said armature to its at rest position between said successive current impulses.

SIDNEY R. SMITH, JR.

REFERENCES CITED

The following references are of record in the file of this patent:

UNITED STATES PATENTS

| Number | Name | Date |
| --- | --- | --- |
| 1,982,986 | Garlington | Dec. 4, 1934 |
| 2,253,400 | Shoemaker et al. | Aug. 19, 1941 |
| 2,387,372 | Watkins | Oct. 23, 1945 |
| 2,452,233 | Gerard et al. | Oct. 26, 1948 |